(12) United States Patent
Dungworth et al.

(10) Patent No.: US 8,735,516 B2
(45) Date of Patent: May 27, 2014

(54) LOW MOLECULAR WEIGHT PHOSPHORUS-CONTAINING POLYACRYLIC ACIDS AND USE THEREOF AS DISPERSANTS

(75) Inventors: Howard Roger Dungworth, Brighouse (GB); David Petty, Bradford (GB); Bolette Urtel, Bobenheim-Roxheim (DE); Ruth Wirschem, Mannheim (DE)

(73) Assignee: BASF SE, Ludwigshafen (DE)

( * ) Notice: Subject to any disclaimer, the term of this patent is extended or adjusted under 35 U.S.C. 154(b) by 90 days.

(21) Appl. No.: 13/364,877

(22) Filed: Feb. 2, 2012

(65) Prior Publication Data
US 2012/0220707 A1    Aug. 30, 2012

Related U.S. Application Data

(60) Provisional application No. 61/439,392, filed on Feb. 4, 2011.

(51) Int. Cl.
C08F 2/10    (2006.01)
C08L 33/02    (2006.01)

(52) U.S. Cl.
USPC ........... 526/81; 526/233; 526/317.1; 524/556

(58) Field of Classification Search
USPC ............................................ 526/233, 317.1
See application file for complete search history.

(56) References Cited

FOREIGN PATENT DOCUMENTS

EP    0 405 818 A2    1/1991
EP    0 969 024 A2    1/2000

OTHER PUBLICATIONS

U.S. Appl. No. 13/569,538, filed Aug. 8, 2012, Detering, et al.
International Search Report issued Jul. 3, 2012 in PCT/EP2012/051562 filed Jan. 31, 2012.

*Primary Examiner* — Vu A Nguyen
(74) *Attorney, Agent, or Firm* — Oblon, Spivak, McClelland, Maier & Neustadt, L.L.P.

(57) ABSTRACT

Aqueous solutions of acrylic acid polymers are prepared by polymerization of acrylic acid in a feed operation with a free-radical initiator in the presence of hypophosphite in water as solvent, by a process comprising (i) initially charging water and optionally one or more ethylenically unsaturated comonomers, (ii) continuously adding acrylic acid in acidic, unneutralized form, optionally one or more ethylenically unsaturated comonomers, aqueous free-radical initiator solution and aqueous hypophosphite solution, and (iii) adding a base to the aqueous solution on completion of the acrylic acid feed, wherein a comonomer content does not exceed 30% by weight and the aqueous hypophosphite solution is added during a total feed time made up of three consecutive feed time spans $\Delta t_I$, $\Delta t_{II}$, and $\Delta t_{III}$, wherein the average feed rate in the second feed time span $\Delta t_{II}$ is greater than the average feed rates in the first and third feed time spans $\Delta t_I$ and $\Delta t_{III}$.

7 Claims, No Drawings

LOW MOLECULAR WEIGHT PHOSPHORUS-CONTAINING POLYACRYLIC ACIDS AND USE THEREOF AS DISPERSANTS

This invention relates to low molecular weight phosphorus-containing polyacrylic acids, aqueous solutions comprising same, processes for production thereof and also use thereof as dispersants.

Dispersants, especially polyacrylic acids, are widely used in technical operations wherein a solid material is converted into a pumpable dispersion. To ensure wide industrial use, these dispersions, which are also known as slurries, have to have not only good pumpability but also stability in storage (minimal aging) coupled with high solids content. It is desirable for the latter to be raised as high as possible, owing to the high energy and transportation costs. A typical example is the use of aqueous calcium carbonate slurries in the production of graphics papers. While good flow properties on the part of the slurries substantially ensure processability in paper production and/or paper coating, the fineness of the dispersed solids determines the optical properties of the paper produced therefrom, such as the opacity for example. A lower particle size for the same solids content of the slurry results in a higher opacity for the paper produced therefrom. The particle size here is decisively influenced not only by the input of mechanical energy during the wet grinding of the pigment, but also through the choice of dispersant used.

It is known that low molecular weight polyacrylic acids produced by free-radical polymerization have good dispersing properties. The weight average molecular weight (Mw) of these polymers should be <50 000 for good performance. Polyacrylic acids with Mw<10 000 are often particularly effective. To produce low molecular weight polyacrylic acids, chain transfer agents are added as molecular weight regulators during the free-radical polymerization of acrylic acid. These regulators have to be adapted to the polymerization initiator and also to the polymerization process. Examples of known initiators are organic and inorganic percompounds, such as peroxodisulfates, peroxides, hydroperoxides and peresters, azo compounds such as 2,2'-azobisisobutyronitrile and redox systems with organic and inorganic components. The regulators used are frequently inorganic sulfur compounds such as hydrogensulfites, disulfites and dithionites, organic sulfides, sulfoxides, sulfones and mercapto compounds such as mercaptoethanol, mercaptoacetic acid and also inorganic phosphorus compounds such as hypophosphorous acid (phosphinic acid) and its salts (e.g., sodium hypophosphite).

EP-A 405 818 discloses a process for forming polymers from monoethylenically unsaturated monocarboxylic acids and optionally further monomers using sodium persulfate as initiator in the presence of hypophosphite as chain transfer agent, wherein an alkaline neutralizer is present during the polymerization in an amount sufficient to neutralize at least 20% of the acidic groups. The low molecular weight polymers obtained comprise at least 80% of the phosphorus from the hypophosphite. At least 70% of the phosphorus is said to end up within the polymer chain, as dialkyl phosphinate. The polymers thus obtained are used inter alia as laundry detergent additives, dispersants for clay slurries or scale inhibitors for water treatment.

In the exemplary embodiments, acrylic acid is polymerized in water in the presence of hypophosphite as chain transfer agent and sodium persulfate as initiator using the feed method wherein aqueous sodium hydroxide solution is added during the polymerization as a further continuous feed. This gives an aqueous polyacrylic acid having a weight average molecular weight $M_w$ of 2700 g/mol, which comprises 72% of the phosphorus in sodium phosphite as dialkyl phosphinate, 18% as monoalkyl phosphinate and 10% as inorganic salts. A comparative example dispenses with the aqueous sodium hydroxide feed and neutralizes with sodium hydroxide solution only after the polymerization has ended. The product obtained here is an aqueous polyacrylic acid having a weight average molecular weight $M_w$ of 4320 g/mol, which comprises just 45% of the sodium phosphite phosphorus as dialkyl phosphinate, 25% as monoalkyl phosphinate and 30% as inorganic salts.

EP-A 510 831 discloses a process for forming polymers from monoethylenically unsaturated monocarboxylic acids, monoethylenically unsaturated dicarboxylic acids and optionally further monomers, comprising no carboxyl group, in the presence of hypophosphorous acid as chain transfer agent. At least 40% of the phosphorus incorporated in the polymer is present as monoalkyl phosphinate and monoalkyl phosphonate at the end of the polymer chain. The copolymers are used inter alia as dispersants, scale inhibitors and laundry detergent additives.

EP-A 618 240 discloses a process for polymerization of monomers in water in the presence of a water-soluble initiator and hypophosphorous acid or a salt thereof. The process is carried out such that the polymer content at the end of the polymerization is at least 50% by weight. This method provides an increased incorporation of the hypophosphite phosphorus in the polymer. The hypophosphite phosphorus is present in the polymer in the form of dialkyl phosphinate, monoalkyl phosphinate and also monoalkyl phosphonate. No information is provided as to the distribution of the phosphorus. The copolymers are used inter alia as dispersants, scale inhibitors and laundry detergent additives.

EP-A 1 074 293 discloses phosphonate-terminated polyacrylic acid having a molecular weight $M_w$ of 2000 to 5800 g/mol as a dispersant for producing aqueous slurries of calcium carbonate, kaolin, clay, talc and metal oxides having a solids content of at least 60% by weight.

The problem addressed by the invention is that of providing low molecular weight polyacrylic acids having improved dispersing performance.

The problem is solved by a process for preparing aqueous solutions of acrylic acid polymers by polymerization of acrylic acid in feed operation with a free-radical initiator in the presence of hypophosphite in water as solvent, which process comprises
(i) initially charging water and optionally one or more ethylenically unsaturated comonomers,
(ii) continuously adding acrylic acid in acidic, unneutralized form, optionally one or more ethylenically unsaturated comonomers, aqueous free-radical initiator solution and aqueous hypophosphite solution,
(iii) adding a base to the aqueous solution on completion of the acrylic acid feed, wherein the comonomer content does not exceed 30% by weight, based on the total monomer content, wherein
the aqueous hypophosphite solution is added during a total feed time made up of three consecutive feed time spans $\Delta t_I$, $\Delta t_{II}$ and $\Delta t_{III}$, wherein the average feed rate in the second feed time span $\Delta t_{II}$ is greater than the average feed rates in the first and third feed time spans $\Delta t_I$ and $\Delta t_{III}$.

Preferably, the first feed time span $\Delta t_I$ amounts to 30 to 70% of the total feed time.

Preferably, the second feed time span $\Delta t_{II}$ amounts to 5 to 25% and more particularly 5 to 15% of the total feed time.

Preferably, the third feed time span comprises two subsidiary feed time spans $\Delta t_{IIIa}$ and $\Delta t_{IIIb}$, wherein the average feed rate during the first subsidiary feed time span $\Delta t_{IIIa}$ is not less than the average feed rate during the first feed time span $\Delta t_I$ and the average feed rate during the second subsidiary feed time span $\Delta t_{IIIb}$ is less than the average feed rate during the first feed time span $\Delta t_I$.

The feed rate is the amount of substance per unit time, $\Delta n/\Delta t$.

The total feed time is generally in the range from 80 to 500 min and preferably in the range from 100 to 400 min.

The comonomers can be included in the initial reaction charge; partly initially charged and partly added as feed; or exclusively added as feed. When they are partly or wholly added as feed, they are generally added simultaneously with the acrylic acid.

In general, water is initially charged and heated to the reaction temperature of at least 75° C. and preferably in the range from 95 to 105° C.

In addition, an aqueous solution of phosphorous acid can be included in the initial charge as a corrosion inhibitor.

This is followed by the commencement of the continuous feeds of acrylic acid optionally of ethylenically unsaturated comonomer, initiator and chain transfer agent. Acrylic acid is added in unneutralized, acidic form. In general, the feeds are commenced simultaneously. Both peroxodisulfate as initiator and hypophosphite as chain transfer agent are added in the form of their aqueous solutions. Hypophosphite can be used in the form of hypophosphorous acid (phosphinic acid) or in the form of salts of hypophosphorous acid. It is particularly preferable to use hypophosphite as hypophosphorous acid or as sodium salt.

In general, acrylic acid is added at constant feed rate. When comonomers are used and at least partly added as feeds, then the feed rate of the comonomer feeds is generally likewise constant. The feed rate of the free-radical initiator solution is generally likewise constant.

Peroxodisulfate is the preferred free-radical initiator. Peroxodisulfate is generally used in the form of the sodium or ammonium salt. The content of a preferably used aqueous peroxodisulfate solution is in the range from 5% to 10% by weight. The hypophosphite content of the aqueous hypophosphite solution is preferably in the range from 35% to 70% by weight.

Preferably, peroxodisulfate is used in amounts of 0.5% to 10% by weight and preferably 0.8% to 5% by weight, based on the total amount of monomers (acrylic acid plus any comonomers).

Preferably, hypophosphite is used in amounts of 4% to 8% by weight and preferably 5% to 7% by weight, based on the total amount of monomers.

The duration of the initiator feed can be up to 50% longer than the duration of the acrylic acid feed. Preferably, the duration of the initiator feed is about 3 to 20% longer than the duration of the acrylic acid feed. The total duration of the chain transfer agent feed is preferably equal to the duration of the acrylic acid feed. In general, the total duration of the chain transfer agent feed is up to 20% shorter or longer than the duration of the acrylic acid feed.

The duration of the monomer feed or—when a comonomer is used—of the monomer feeds is in the range from 2 to 5 h for example. When all the feeds are commenced simultaneously, for example, the chain transfer agent feed ends from 10 to 30 min before the end of the monomer feed and the initiator feed ends from 10 to 30 min after the end of the monomer feed.

In general, a base is added to the aqueous solution on completion of the acrylic acid feed. This serves to at least partially neutralize the acrylic acid polymer formed. Partially neutralized is to be understood as meaning that only some of the carboxyl groups in the acrylic acid polymer are present in salt form. In general, sufficient base is added for the pH to subsequently be in the range from 3 to 8.5, preferably in the range from 4 to 8.5 and more particularly in the range from 4.0 to 5.5 (partially neutralized) or from 6.5 to 8.5 (fully neutralized). It is preferable to use aqueous sodium hydroxide solution as base. Besides aqueous sodium hydroxide solution, it is also possible to use ammonia or amines, for example triethanolamine. The degree of neutralization achieved for the polyacrylic acids obtained is between 15 and 100% and preferably between 30 and 100%. The neutralization is generally carried out over a comparatively long period ranging for example from ½ hour to 3 hours in order that the heat of neutralization may be efficiently removed.

In general, the polymerization is carried out under inert gas atmosphere. This generally provides acrylic acid polymers where the terminally bound phosphorus thereof is substantially (generally at least 90%) present in the form of phosphinate groups.

In a further version, an oxidation step is carried out on completion of the polymerization. The oxidation step serves to convert terminal phosphinate groups into terminal phosphonate groups. The oxidation is generally effected by treating the acrylic acid polymer with an oxidizing agent, preferably with aqueous hydrogen peroxide solution.

This provides aqueous solutions of acrylic acid polymers having a solids content of generally at least 30% by weight, preferably at least 35% by weight, more preferably in the range from 40% to 70% by weight and more particularly in the range from 40% to 55% by weight of polymer.

The acrylic acid polymers obtainable according to the present invention have a total phosphorus content of organically and possibly inorganically bound phosphorus, wherein
(a) a first portion of the phosphorus is present in the form of phosphinate groups bound within the polymer chain,
(b) a second portion of the phosphorus is present in the form of phosphinate and/or phosphonate groups bound at the polymer chain end,
(c) possibly a third portion of the phosphorus is present in the form of dissolved inorganic salts of phosphorus,
and generally at least 76% of the total phosphorus content is present in the form of phosphinate groups bound within the polymer chain.

Preferably at least 78% and more preferably at least 80% of the total phosphorus content is present in the form of phosphinate groups bound within the polymer chain. The feed method of the present invention provides a particularly high content of phosphorus bound within the polymer chain.

Generally at most 15% and preferably at most 12% of the phosphorus is present in the form of phosphinate and/or phosphonate groups bound at the polymer chain end. It is more preferable for 4 to 12% and especially 7 to 12% of the phosphorus to be present in the form of phosphinate and/or phosphonate groups bound at the polymer chain end.

Up to 15% of the phosphorus present in the aqueous solution of the acrylic acid polymers can be present in the form of inorganic phosphorus, more particularly in the form of hypophosphite and phosphite. Preferably from 2 to 12% and more preferably from 4 to 11% of total phosphorus is present in the form of inorganically bound phosphorus.

The ratio of phosphorus bound within the polymer chain to phosphorus bound at the chain end is at least 4:1. This ratio is preferably at least 5:1 to 10:1 and more particularly 6:1 to 9:1.

The weight average molecular weight of the acrylic acid polymer is generally in the range from 1000 to 20 000 g/mol, preferably in the range from 3500 to 12 000 g/mol, more preferably in the range from 3500 to 8000 g/mol, more particularly in the range from 3500 to 6500 g/mol and specifically in the range from 4000 to 6500 g/mol. The molecular weight can be specifically set within these ranges via the amount of chain transfer agent used.

The proportion of polymers having a molecular weight of <1000 g/mol is generally ≤10% by weight and preferably ≤5% by weight, based on total polymer.

The molecular weights were determined via GPC on buffered (to pH 7) aqueous solutions of the polymers using hydroxyethyl methacrylate copolymer network (HEMA) as stationary phase and sodium polyacrylate standards.

The $M_w/M_n$ polydispersity index of the acrylic acid polymer is generally ≤2.5 and preferably in the range from 1.5 to 2.5, for example 2.

The K-values, determined by the Fikentscher method on a 1% by weight solution in completely ion-free water, are generally in the range from 10 to 50, preferably in the range from 15 to 35 and more preferably in the range from 20 to 30.

The acrylic acid polymer may comprise up to 30% by weight, preferably up to 20% by weight and more preferably up to 10% by weight, based on all ethylenically unsaturated monomers, of ethylenically unsaturated comonomers in copolymerized form. Examples of suitable ethylenically unsaturated comonomers are methacrylic acid, maleic acid, maleic anhydride, vinylsulfonic acid, allylsulfonic acid and AMPS and also salts thereof. Mixtures of these comonomers may also be present.

Particular preference is given to acrylic acid homopolymers without comonomer content.

The resulting aqueous solutions of the acrylic acid polymers can be used directly as dispersants.

The invention also provides for the use of the aqueous solutions of the acrylic acid polymers or the acrylic acid polymers themselves as dispersing auxiliaries for inorganic pigments and fillers, e.g., $CaCO_3$, kaolin, talcum, $TiO_2$, ZnO, $ZrO_2$, $Al_2O_3$ and MgO.

The slurries obtained therefrom are used as white pigments for graphics papers and paints, as deflocculants for the production of ceramic materials of construction, or else as fillers for thermoplastics. However, the acrylic acid polymers can also be used for other purposes, for example in laundry detergents, dishwasher detergents, technical/industrial cleaners, for water treatment or as oil field chemicals. If desired, they can be converted into powder form via various drying methods, e.g., spray drying, roll drying or paddle drying, before use.

A particularly preferred dispersions (slurry) for which the acrylic acid polymers of the present invention are used is ground calcium carbonate. The grinding is carried out continuously or batchwise in aqueous suspension. The calcium carbonate content of this suspension is generally ≥50% by weight, preferably ≥60% by weight and more preferably ≥70% by weight. Typically, the amount of polyacrylic acid used according to the present invention is in the range from 0.1% to 2% by weight and preferably in the range from 0.3% to 1.5% by weight, all based on the calcium carbonate in the suspension. After grinding, the particle size in these calcium carbonate slurries is preferably less than 2 μm for 95% of the particles and less than 1 μm for 75% of the particles. The calcium carbonate slurries obtained have excellent rheological properties and are still pumpable after several days' storage, as is evident from the viscosity courses in table 2.

The examples which follow illustrate the invention.

EXAMPLES

All molecular weights were determined via GPC. The GPC conditions used are as follows: 2 columns (Suprema Linear M) and a precolumn (Suprema Vorsäule), all of the brand Suprema-Gel (HEMA) from Polymer Standard Services (Mainz, Germany), was operated at 35° C. at a flow rate of 0.8 ml/min. The eluent used was the aqueous solution admixed with 0.15 M NaCl and 0.01 M $NaN_3$ and buffered with TRIS at pH 7. Calibration was done with a Na-PAA standard, the molecular weight distribution curve of which had been determined by SEC laser light dispersion coupling, using the calibration method of M. J. R. Cantow et al. (J. Polym. Sci., A-1, 5(1967) 1391-1394), albeit without the concentration correction proposed therein. The samples were all adjusted to pH 7 with 50% by weight aqueous sodium hydroxide solution. A portion of the solution was diluted with completely ion free water to a solids content of 1.5 mg/mL and stirred for 12 hours. The samples were then filtered, and 100 μL was injected through a Sartorius Minisart RC 25 (0.2 μm).

Example 1

A reactor was initially charged with 502.0 g of completely ion free water. The water was heated under nitrogen to 100° C. internal temperature. At this temperature, 11.0 g of a 15% by weight aqueous ammonium persulfate solution and 47.46 g of a 15% by weight aqueous sodium hypophosphite solution were added simultaneously within 1 minute. Then, 1000 g of an 80% by weight aqueous solution of a distilled acrylic acid, 86.0 g of a 15% by weight aqueous ammonium peroxodisulfate solution and a first quantity of 130.14 g of a 15% by weight aqueous sodium hypophosphite solution were metered in separately and concurrently under agitation. The acrylic acid was added within 2 hours, the ammonium peroxodisulfate within 2.25 hours and the sodium hypophosphite within 1 hour. On completion of the feed of the first quantity of sodium hypophosphite solution, a second quantity of the 15% by weight aqueous sodium hypophosphite solution was then added in stages. First 42.66 g within 10 minutes (4.26 g/minute), then 18.6 g within 5 minutes (3.74 g/minute), then 16 g within 5 minutes (3.20 g/minute), then 40 g within 15 minutes (2.66 g/minute), then 16 g within 10 minutes (1.60 g/minute), then 10.6 g within 10 minutes (1.06 g/minute) and 2.66 g within 5 minutes (0.52 g/minute). On completion of the ammonium peroxodisulfate feed, 310.86 g of a 50% aqueous sodium hydroxide solution were added at an internal temperature of 100° C. to part-neutralize the polyacrylic acid obtained. The polymer solution was then cooled down to room temperature. The pH, the molecular weights $M_n$ and $M_w$, the solids content and the residual acrylic acid content were determined and the solution was visually inspected.

Example 2

A reactor was initially charged with 502.0 g of completely ion free water. The water was heated under nitrogen to 100° C. internal temperature. At this temperature, 11.0 g of a 15% by weight aqueous sodium persulfate solution and 47.46 g of a 15% by weight aqueous sodium hypophosphite solution were added simultaneously within 1 minute. Then, 1000 g of an 80% by weight aqueous solution of a distilled acrylic acid, 86.0 g of a 15% by weight aqueous sodium peroxodisulfate solution and a first quantity of 130.14 g of a 15% by weight aqueous sodium hypophosphite solution were metered in separately and concurrently under agitation. The acrylic acid was added within 2 hours, the sodium peroxodisulfate within 2.25 hours and the sodium hypophosphite within 1 hour. On completion of the feed of the first quantity of sodium hypophosphite solution, a second quantity of a 15% by weight aqueous sodium hypophosphite solution was then added in stages. First 42.66 g within 10 minutes (4.26 g/minute), then 18.6 g within 5 minutes (3.74 g/minute), then 16 g within 5 minutes (3.20 g/minute), then 40 g within 15 minutes (2.66 g/minute), then 16 g within 10 minutes (1.60 g/minute), then 10.6 g within 10 minutes (1.06 g/minute) and 2.66 g within 5 minutes (0.52 g/minute). On completion of the sodium peroxodisulfate feed, 310.86 g of a 50% by weight aqueous sodium hydroxide solution were added at an internal temperature of 100° C. to part-neutralize the polyacrylic acid. The polymer solution was then cooled down to room temperature. The pH, the molecular weights $M_n$ and $M_w$, the solids content and the residual acrylic acid content were determined and the solution was visually inspected.

Example 3

A reactor was initially charged with 502.0 g of completely ion free water. The water was heated under nitrogen to 100° C. internal temperature. At this temperature, 11.0 g of a 15% by weight aqueous ammonium persulfate solution and 47.46 g of a 15% by weight aqueous sodium hypophosphite solution were added simultaneously within 1 minute. Then, 1000 g of an 80% by weight aqueous solution of a distilled acrylic acid, 86.0 g of a 15% by weight aqueous ammonium peroxodisulfate solution and a first quantity of 130.14 g of a 15% by weight aqueous sodium hypophosphite solution were metered in separately and concurrently under agitation. The acrylic acid was added within 5 hours, the ammonium peroxodisulfate within 5.25 hours and the sodium hypophosphite within 2.5 hours. On completion of the feed of the first quantity of sodium hypophosphite, a second quantity of the 15% by weight aqueous sodium hypophosphite solution was then added in stages. First 42.66 g within 25 minutes (1.71 g/minute), then 18.6 g within 12.5 minutes (1.49 g/minute), then 16 g within 12.5 minutes (1.28 g/minute), then 40 g within 37.5 minutes (1.07 g/minute), then 16 g within 25 minutes (0.64 g/minute), then 10.6 g within 25 minutes (0.42 g/minute) and finally 2.66 g within 12.5 minutes (0.21 g/minute). On completion of the ammonium peroxodisulfate feed, 310.86 g of a 50% by weight aqueous sodium hydroxide solution were added at an internal temperature of 100° C. to part-neutralize the polyacrylic acid formed. The polymer solution was then cooled down to room temperature. The pH, the molecular weights $M_n$ and $M_w$, the solids content and the residual acrylic acid content were determined and the solution was visually inspected.

Example 4

A reactor was initially charged with 502.0 g of completely ion free water. The water was heated under nitrogen to 100° C. internal temperature. At this temperature, 11.0 g of a 15% by weight aqueous sodium persulfate solution and 47.46 g of a 15% by weight aqueous sodium hypophosphite solution were added simultaneously within 1 minute. Then, 1000 g of an 80% by weight aqueous solution of a distilled acrylic acid, 86.0 g of a 15% by weight aqueous sodium peroxodisulfate solution and a first quantity of 130.14 g of a 15% by weight aqueous sodium hypophosphite solution were metered in separately and concurrently under agitation. The acrylic acid was added within 5 hours, the sodium peroxodisulfate within 5.25 hours and the sodium hypophosphite within 2.5 hours. On completion of the feed of the first quantity of sodium hypophosphite solution, a second quantity of the 15% by weight aqueous sodium hypophosphite solution was added in stages. First 42.66 g within 25 minutes (1.71 g/minute), then 18.6 g within 12.5 minutes (1.49 g/minute), then 16 g within 12.5 minutes (1.28 g/minute), then 40 g within 37.5 minutes (1.07 g/minute), then 16 g within 25 minutes (0.64 g/minute), then 10.6 g within 25 minutes (0.42 g/minute) and 2.66 g within 12.5 minutes (0.21 g/minute). On completion of the ammonium peroxodisulfate feed, 310.86 g of a 50% by weight aqueous sodium hydroxide solution were added at an internal temperature of 100° C. to part-neutralize the polyacrylic acid formed. The pH, the molecular weights $M_n$ and $M_w$, the solids content and the residual acrylic acid content were determined and the solution was visually inspected.

Example 5

Comparative Example

A reactor was initially charged with 502.0 g of completely ion free water. The water was heated under nitrogen to 100° C. internal temperature. At this temperature, 11.0 g of a 15% by weight aqueous ammonium persulfate solution and 47.46 g of a 15% by weight aqueous sodium hypophosphite solution were added simultaneously within 1 minute. Then, 1000 g of an 80% by weight aqueous solution of a distilled acrylic acid, 86.0 g of a 15% by weight aqueous ammonium peroxodisulfate solution and 276.8 g of a 15% by weight aqueous sodium hypophosphite solution were metered in separately and concurrently under agitation. The acrylic acid was added within 2 hours, the ammonium peroxodisulfate within 2.25 hours and the sodium hypophosphite within 2 hours. On completion of the ammonium peroxodisulfate feed, 310.86 g of a 50% by weight aqueous sodium hydroxide solution were added at an internal temperature of 100° C. to part-neutralize the polyacrylic acid formed. The polymer solution was then cooled down to room temperature. The pH, the molecular weights $M_n$ and $M_w$, the solids content and the residual acrylic acid content were determined and the solution was visually inspected.

Example 6

A reactor was initially charged with 502.0 g of completely ion free water. The water was heated under nitrogen to 100° C. internal temperature. At this temperature, 23.6 g of a 7% by weight aqueous sodium persulfate solution and 20.0 g of a 59% by weight aqueous sodium hypophosphite solution were added simultaneously within 1 minute. Then, 930.0 g of an 86% by weight aqueous solution of distilled acrylic acid, 184.3 g of a 7% by weight aqueous sodium peroxodisulfate solution and a first quantity of 55.0 g of a 59% by weight aqueous sodium hypophosphite solution were metered in separately and concurrently under agitation. The acrylic acid was added within 5 hours, the sodium peroxodisulfate within 5.25 hours and the sodium hypophosphite within 2.5 hours. On completion of the feed of the first quantity of sodium hypophosphite solution, a second quantity of a 59% by weight aqueous sodium hypophosphite solution was then added in stages. First 18.0 g within 25 minutes (0.72 g/minute), then 8.0 g within 14 minutes (0.57 g/minute), then 6.0 g within 12 minutes (0.50 g/minute), then 17 g within 37 minutes (0.46 g/minute), then 7 g within 25 minutes (0.28 g/minute), then 4.0 g within 25 minutes (0.16 g/minute) and 1.0 g within 12 minutes (0.08 g/minute). On completion of the sodium peroxodisulfate feed, the polymer solution was cooled down to room temperature. 310.86 g of a 50% by weight aqueous sodium hydroxide solution were then added to set a degree of neutralization of 35%. The pH, the molecular weights $M_n$ and $M_w$, the solids content and the residual acrylic acid content were determined and the solution was visually inspected.

Example 7

A reactor was initially charged with 502.0 g of completely ion free water. The water was heated under nitrogen to 100° C. internal temperature. At this temperature, 23.6 g of a 7% by weight aqueous sodium persulfate solution and 8.0 g of a 59% by weight aqueous sodium hypophosphite solution were added simultaneously within 1 minute. Then, 930.0 g of an 86% by weight aqueous solution of distilled acrylic acid, 184.3 g of a 7% by weight aqueous sodium peroxodisulfate solution and a first quantity of 22.0 g of a 59% by weight aqueous sodium hypophosphite solution were metered in separately and concurrently under agitation. The acrylic acid was added within 5 hours, the sodium peroxodisulfate within 5.25 hours and the sodium hypophosphite within 2.5 hours. On completion of the feed of the first quantity of sodium hypophosphite solution, a second quantity of a 59% by weight aqueous sodium hypophosphite solution was then added in stages. First 7.0 g within 25 minutes (0.28 g/minute), then 3.0 g within 14 minutes (0.21 g/minute), then 2.0 g within 12 minutes (0.17 g/minute), then 6 g within 37 minutes (0.16 g/minute), then 3 g within 25 minutes (0.12 g/minute), then 2.0 g within 25 minutes (0.08 g/minute) and 1.0 g within 12 minutes (0.08 g/minute). On completion of the sodium peroxodisulfate feed, the polymer solution was cooled down to room temperature. 310.86 g of a 50% by weight aqueous sodium hydroxide solution were then added to set a degree of neutralization of 35%. The pH, the molecular weights $M_n$ and $M_w$, the solids content and the residual acrylic acid content were determined and the solution was visually inspected.

Example 8

A reactor was initially charged with 502.0 g of completely ion free water. The water was heated under nitrogen to 100° C. internal temperature. At this temperature, 23.6 g of a 7% by weight aqueous sodium persulfate solution and 12.1 g of a 59% by weight aqueous sodium hypophosphite solution were added simultaneously within 1 minute. Then, 930.0 g of an 86% by weight aqueous solution of distilled acrylic acid, 184.3 g of a 7% by weight aqueous sodium peroxodisulfate solution and a first quantity of 33.0 g of a 59% by weight aqueous sodium hypophosphite solution were metered in separately and concurrently under agitation. The acrylic acid was added within 5 hours, the sodium peroxodisulfate within 5.25 hours and the sodium hypophosphite within 2.5 hours. On completion of the feed of the first quantity of sodium hypophosphite solution, a second quantity of a 59% by weight aqueous sodium hypophosphite solution was then added in stages. First 11.0 g within 25 minutes (0.44 g/minute), then 5.0 g within 14 minutes (0.36 g/minute), then 4.0 g within 12 minutes (0.33 g/minute), then 10 g within 37 minutes (0.27 g/minute), then 4.0 g within 25 minutes (0.16 g/minute), then 3.0 g within 25 minutes (0.12 g/minute) and 1.0 g within 12 minutes (0.08 g/minute). On completion of the sodium peroxodisulfate feed, the polymer solution was cooled down to room temperature. 310.86 g of a 50% by weight aqueous sodium hydroxide solution were then added to set a degree of neutralization of 35%. The pH, the molecular weights $M_n$ and $M_w$, the solids content and the residual acrylic acid content were determined and the solution was visually inspected.

Example 9

A reactor was initially charged with 502.0 g of completely ion free water. The water was heated under nitrogen to 100° C. internal temperature. At this temperature, 11.0 g of a 15% by weight aqueous sodium persulfate solution and 47.5 g of a 15% by weight aqueous sodium hypophosphite solution were added simultaneously within 1 minute. Then, 1000 g of an 80% by weight aqueous solution of distilled acrylic acid, 86.0 g of a 15% by weight aqueous sodium peroxodisulfate solution and a first quantity of 130.0 g of a 15% by weight aqueous sodium hypophosphite solution were metered in separately and concurrently under agitation. The acrylic acid was added within 2 hours, the sodium peroxodisulfate within 2.25 hours and the sodium hypophosphite within 1 hour. On completion of the feed of the first quantity of sodium hypophosphite solution, a second quantity of a 15% by weight aqueous sodium hypophosphite solution was then added in stages. First 43.0 g within 25 minutes (1.72 g/minute), then 19.0 g within 13 minutes (1.46 g/minute), then 16.0 g within 13 minutes (1.23 g/minute), then 40 g within 37 minutes (1.08 g/minute), then 16.0 g within 25 minutes (0.64 g/minute), then 11.0 g within 25 minutes (0.44 g/minute) and 2.0 g within 5 minutes (0.4 g/minute). On completion of the sodium peroxodisulfate feed, the polymer solution was cooled down to room temperature. 310.86 g of a 50% by weight aqueous sodium hydroxide solution were then added to set a degree of neutralization of 35%. The pH, the molecular weights $M_n$ and $M_w$, the solids content and the residual acrylic acid content were determined and the solution was visually inspected.

Example 10

Comparative Example

A reactor was initially charged with 540.0 g of completely ion free water together with 9.0 g of a 0.15% iron(II) sulfate heptahydrate. This initial charge was heated under nitrogen to 90° C. internal temperature. At this temperature, 77.2 g of a 35% by weight aqueous sodium hypophosphite solution were added simultaneously within 1 minute. Then, 900 g of a distilled acrylic acid, 59.2 g of a 15.2% by weight aqueous sodium peroxodisulfate solution and 77.2 g of a 20.6% by weight aqueous sodium hypophosphite solution were metered in separately and concurrently under agitation. The acrylic acid was added within 2 hours, the sodium peroxodisulfate within 2 hours and the sodium hypophosphite within 1.6 hours. On completion of the sodium peroxodisulfate feed the polymer solution was subsequently stirred at 90° C. for 30 minutes and then cooled down to room temperature. The pH, the molecular weights $M_n$ and $M_w$, the solids content and the residual acrylic acid content were determined and the solution was visually inspected.

The analytical data of the acrylic acid polymers obtained are summarized below in table 1.

TABLE 1

| Example | Solids content [%][a] | K value[b] | pH (tq) | Mw[c] | PDI[c] | Oligomer content <1000 g/mol | P % internal[d] | P % external[d] | P % inorg[d] |
|---|---|---|---|---|---|---|---|---|---|
| 1 | 42.5 | 24.8 | 4.3 | 5080 | 2.1 | 4.7 | 79.6 | 11.3 | 9.2 |
| 2 | 41.5 | 24.9 | 4.3 | 4990 | 2.1 | 4.9 | 81.6 | 6.9 | 10.5 |
| 3 | 42.1 | 24.1 | 4.3 | 4820 | 2.0 | 5.2 | 85.8 | 6.4 | 7.8 |
| 4 | 43.6 | 23.2 | 4.5 | 4960 | 2.1 | 5.4 | 86.7 | 5.6 | 7.7 |
| 5 | 41.6 | 26.0 | 4.3 | 5490 | 2.1 | 4.4 | 65.1 | 13.0 | 20.5 |
| 6 | 46.4 | 16.6 | 4.2 | 3040 | 1.6 | 6.4 | 86.3 | 8.1 | 5.6 |
| 7 | 45.8 | 30.3 | 4.2 | 8020 | 2.4 | 2.5 | 80.8 | 11.7 | 7.5 |
| 8 | 46.1 | 24.0 | 4.3 | 4990 | 1.9 | 3.4 | 83.9 | 10.2 | 5.9 |
| 9 | 43.5 | 23.7 | 4.3 | 5080 | 2.0 | 3.8 | 86.7 | 5.6 | 7.7 |
| 10 | 58.6 | 23.5 | 1.8 | 4610 | 1.8 | 3.7 | 75.9 | 18.8 | 5.3 |

[a] ISO 3251, (0.25 g, 150° C., 2 h)
[b] determined by Fikentscher method with 1% solution in completely ion free water
[c] determined by gel permeation chromatography
[d] determined with $^{31}P\{^1H\}$ and $^{31}P$ NMR Performance Tests Use of Acrylic Acid Polymers as Dispersants The polyacrylic acid solutions obtained were tested for their usefulness as dispersants for producing slurries. For this, calcium carbonate was in each case ground using a Dispermat. For this, in each case, 300 g of calcium carbonate (Hydrocarb OG from Omya) and 600 g of ceramic beads were mixed and initially charged to a 500 ml double-wall vessel filled with tap water. Then, 100 g of a 3% by weight aqueous solution of the in-test polyacrylic acid was added after adjustment to pH 5.0. The grinding was done using a grinding assembly of the type Dispermat AE-C (from VMA-Getzmann) with a cross-beam stirrer at 1200 rpm. As soon as 70% of the pigment had a particle size (PSD) of less than 1 μm, the grinding operation was terminated (about 70 min, LS 13320 particle measuring instrument from Beckman Coulter). After grinding, the slurry was filtered through a 780 μm filter using a porcelain suction filter to remove the ceramic beads, and the solids content of the slurry was adjusted to 77%. The viscosity of the slurry was determined at once, after 24 h and after 168 h using a Brookfield DV II viscometer (using spindle No. 3).

The results of the dispersing tests are summarized in table 2.

TABLE 2

| Example | Particle size distribution <2 μm | Particle size distribution <1 μm | Dynamic viscosity [mPas] at 100 rpm after 1 h | after 24 h | After 96 h | after 168 h | Slurry solids content [%] |
|---|---|---|---|---|---|---|---|
| 1 | 99.1 | 74.0 | 527 | 930 | 1750 | 2450 | 77.0 |
| 2 | 98.9 | 72.9 | 620 | 1870 | 2220 | 3341 | 77.0 |
| 3 | 97.6 | 72.6 | 687 | 1710 | 2747 | 3419 | 77.0 |
| 4 | 97.2 | 71.1 | 619 | 1620 | 2357 | 3289 | 77.0 |
| 5 | 98.9 | 72.5 | 820 | 2540 | 3960 | 5270 | 77.0 |
| 6 | 99.5 | 74.0 | 2034 | 4055 | >6000 | >6000 | 77.0 |
| 7 | 99.0 | 74.0 | 835 | 1902 | 3209 | 4050 | 77.0 |
| 8 | 99.1 | 74.6 | 524 | 949 | 1974 | 2567 | 77.0 |
| 9 | 98.9 | 75.0 | 628 | 1448 | 2280 | 2890 | 77.0 |
| 10 | 98.9 | 72.4 | 1284 | 3011 | 4380 | 5645 | 77.0 |

We claim:

1. A process for preparing aqueous solutions of acrylic acid polymers by polymerization of acrylic acid in feed operation with a free-radical initiator in the presence of hypophosphite in water as solvent, which process comprises
   (i) initially charging water and optionally one or more ethylenically unsaturated comonomers,
   (ii) continuously adding acrylic acid in acidic, unneutralized form, optionally one or more ethylenically unsaturated comonomers, aqueous free-radical initiator solution and aqueous hypophosphite solution,
   (iii) adding a base to the aqueous solution on completion of the acrylic acid feed,
   wherein the comonomer content does not exceed 30% by weight, based on the total monomer content, wherein the aqueous hypophosphite solution is added during a total feed time made up of three consecutive feed time spans $\Delta t_I$, $\Delta t_{II}$ and $\Delta t_{III}$, wherein the average feed rate in the second feed time span $\Delta t_{II}$ is greater than the average feed rates in the first and third feed time spans $\Delta t_I$ and $\Delta t_{III}$.

2. The process according to claim 1 wherein the first feed time span $\Delta t_I$ amounts to 30 to 70% of the total feed time.

3. The process according to claim 1 wherein the second feed time span amounts to 5 to 25% of the total feed time.

4. The process according to claim 1 wherein the third feed time span comprises two subsidiary feed time spans $\Delta t_{IIIa}$ and $\Delta t_{IIIb}$, wherein the average feed rate during the first subsidiary feed time span $\Delta t_{IIIa}$ is not less than the average feed rate during the first feed time span and the average feed rate during the second subsidiary feed time span $\Delta t_{IIIb}$ is less than the average feed rate during the first feed time span.

5. The process according to claim 1 wherein the total feed time is in the range from 80 to 500 min.

6. The process according to claim 1 wherein up to 30% by weight of comonomers selected from the group consisting of methacrylic acid, maleic acid, maleic anhydride, vinylsulfonic acid, allylsulfonic acid and 2-acrylamido-2-methylpropanesulfonic acid is co-interpolymerized.

7. The process according to claim 1 wherein the polymerization is carried out under inert gas atmosphere.

* * * * *